United States Patent [19]
Coe, III

[11] Patent Number: 5,210,886
[45] Date of Patent: May 18, 1993

[54] DUAL OUTLET BATHTUB DRAIN VALVE FOR WATER CONSERVATION SYSTEM

[76] Inventor: John A. Coe, III, 615 Marquette Street, Pacific Palisades, Calif. 90272

[21] Appl. No.: 775,706

[22] Filed: Oct. 10, 1991

[51] Int. Cl.$^5$ .................. E03C 1/232; F04B 49/00; F16K 31/44; F17D 1/13

[52] U.S. Cl. .................. 4/665; 4/683; 137/597; 137/625.15; 251/279; 417/41

[58] Field of Search .................. 4/202, 203, 204, 317, 4/318, 546, 597, 625, 626, 653, 664, 665, 683, 686, 559, 567, 601; 137/625.46, 625.14, 625.15, 625.16, 433; 251/279, 310, 311; 417/41

[56] References Cited

U.S. PATENT DOCUMENTS

| | | | |
|---|---|---|---|
| 57,321 | 8/1866 | Heald | 137/433 |
| 583,906 | 6/1897 | Hull | 137/597 |
| 789,736 | 5/1905 | Hoey | 4/203 |
| 1,046,427 | 12/1912 | Barney | 137/625.16 X |
| 1,065,265 | 6/1913 | Nordmark | 4/601 |
| 1,155,871 | 10/1915 | Bauer | 251/293 |
| 1,206,544 | 11/1916 | Kaplan | 137/625.14 |
| 1,283,818 | 11/1918 | Laun | 137/597 |
| 1,806,449 | 5/1931 | Florez | 417/41 |
| 2,045,308 | 6/1936 | Wolff | 137/597 X |
| 2,651,051 | 9/1953 | Parks et al. | 4/203 |
| 2,938,216 | 5/1960 | Murray | 4/559 |
| 3,108,779 | 10/1963 | Anderson | 251/315 X |
| 3,112,497 | 12/1963 | Call | 4/665 X |
| 3,204,924 | 9/1965 | Bredtschneider | 251/315 X |
| 3,359,999 | 12/1967 | Mueller | 251/315 X |
| 3,535,712 | 10/1970 | Zeff et al. | 4/317 |
| 3,717,142 | 2/1973 | Mickelson | 4/559 X |
| 4,112,972 | 9/1978 | Lajeuness | 137/597 |
| 4,115,879 | 9/1978 | Toms | 4/318 |
| 4,162,218 | 7/1979 | McCormick | 4/665 X |
| 4,359,789 | 11/1982 | Roberts | 4/318 X |
| 4,947,494 | 8/1990 | Moreland | 4/202 |

FOREIGN PATENT DOCUMENTS

| | | | |
|---|---|---|---|
| 2211620 | 9/1973 | Fed. Rep. of Germany | 4/317 |
| 2710617 | 9/1978 | Fed. Rep. of Germany | 4/317 |
| 2908679 | 9/1980 | Fed. Rep. of Germany | 4/317 |
| 3434267 | 3/1986 | Fed. Rep. of Germany | 4/665 |
| 0065889 | 4/1982 | Japan | 417/41 |
| 0300427 | 12/1990 | Japan | 4/665 |

OTHER PUBLICATIONS

"Demonstration of Waste Flow Reduction from Households", U.S. EPA, Sep. 1974.

Primary Examiner—Henry J. Recla
Assistant Examiner—Robert M. Fetsuga
Attorney, Agent, or Firm—Poms, Smith, Lande & Rose

[57] ABSTRACT

A system for recycling water used in a bathtub/shower is disclosed. The system alternatively directs water drained from the shower or bathtub to either a recycled water storage tank or a sewer line. The water in the recyclable water tank is subsequently pumped to a sprinkler system or an outdoor faucet. The water is directed to either the sewer line or the storage tank through the use of a valve with a first inlet for accepting water from the drain of the bathtub, a second inlet for accepting water from the overflow drain of the bathtub, a first outlet leading to the sewer line, and a second outlet leading to the recycled water storage tank. The valve is a modified ball valve that either blocks the first outlet or the second outlet only, and all other parts remain open. The position of the ball portion of the valve is controlled by a lever mounted on the bathtub overflow plate. The lever is interconnected to the ball portion of the valve, such that changing the position of the overflow plate lever causes the ball portion of the valve to change positions.

3 Claims, 3 Drawing Sheets

FIG. 1
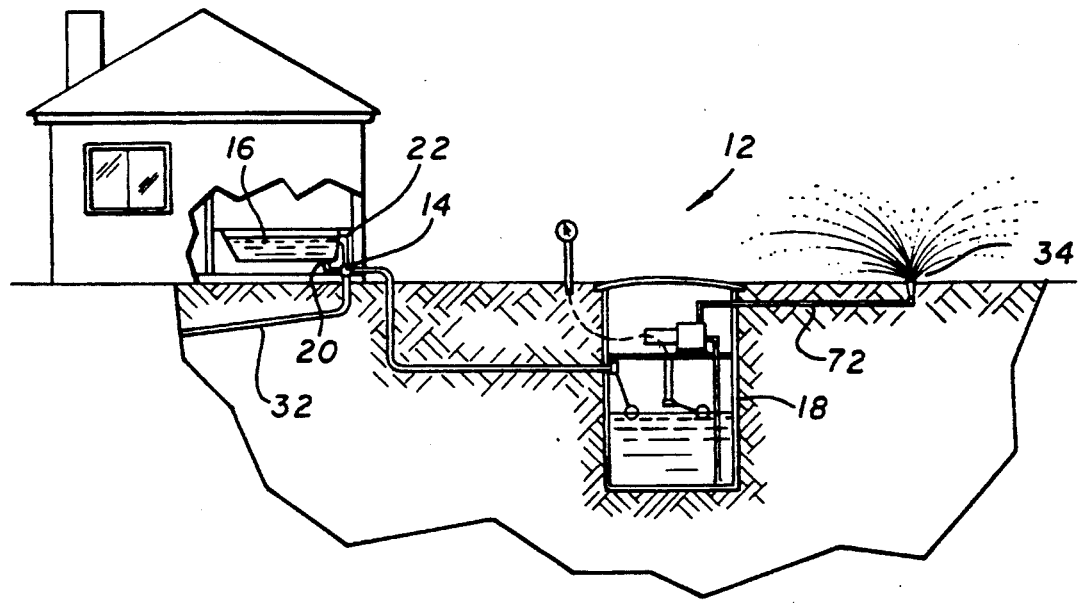
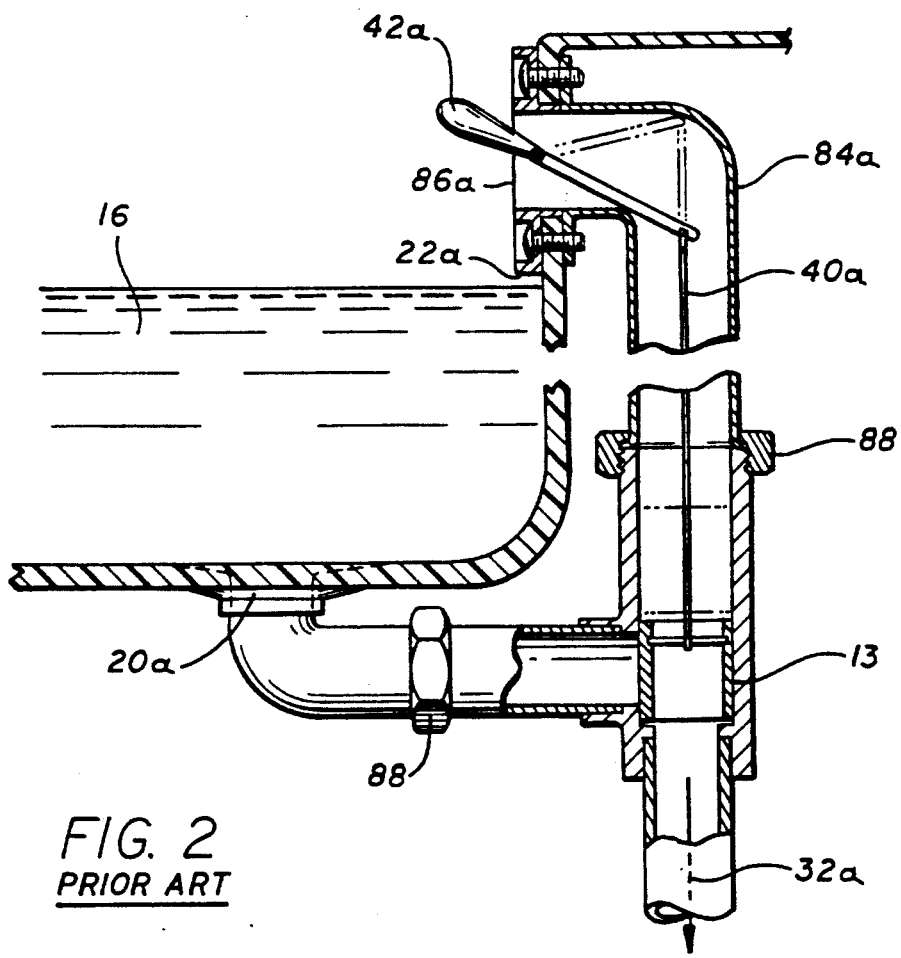
FIG. 2
PRIOR ART

DUAL OUTLET BATHTUB DRAIN VALVE FOR WATER CONSERVATION SYSTEM

I. FIELD OF INVENTION

This invention relates to a water conservation system utilizing a valve for bathtub, shower, or bathtub/shower combination drains, and more particularly to a water conservation system utilizing a valve providing two outlets for a bathtub/shower drain, one outlet for sewage water, and a second outlet for recyclable water.

II. BACKGROUND OF INVENTION

A substantial waste of water occurs every day during showers or baths in households across the country. Part of this waste occurs when members of the household waste gallons of clean water by simply running the hot water tap until the hot water travels from the water heater to the tap. For example, in order to take a warm shower, the user first turns on the warm water in the shower. Typically, however, it takes several minutes for the hot water to travel from the water heater to the shower. Therefore, after the user turns on the water, he usually waits for several minutes until the hot water reaches the shower tap. After the hot water has reached the shower tap, the user then begins his shower.

During the minute or two that it takes for the cold water to purge from the hot water line, gallons of clean water flow into the sewer lines. A typical non-low flow shower head emits approximately four to six gallons of water a minute. Therefore, during the time that cold water is running, approximately six to ten gallons of clean water flow into the sewer lines, or half of that amount if it is a low-flow head. Moreover, the actual bathing process typically only takes a few minutes. Many people, however, enjoy standing under a warm shower before or after the bathing process is completed. During that time many gallons of relatively clean water are also flowing into the sewer lines.

In order to save some of the relatively clean water, one method suggested by water companies is to place a bucket under the tap in order to collect the clean cold water and reuse it later. However, this method of water conservation is burdensome and time consuming.

Many people enjoy soaking in a bathtub full of hot water. Also, people often soak in hot tubs after showering, such that the water in the tub is still relatively clean after they are finished soaking. Although this water is also relatively clean, it is drained into the sewer lines. Because a bath uses anywhere from thirty to fifty gallons of water, it is desirable to find a method of recycling this water.

As another method of conserving water, water companies are also suggesting the elimination or reduction of landscape irrigation and lawn watering. Therefore, many homeowners have allowed their landscaping to suffer in an attempt to avoid using large amounts of water for irrigation.

The problem created by the waste of relatively clean bath and shower water is two-fold. The first problem is the usage and cost of the water. The second problem is the increased sewer handling requirements created by the water in the sewer lines. In many municipalities, sewage treatment requirements have become a substantial problem. As populations have increased, standards for the treatment of sewage has become more stringent, and the expensive piping system that conveys the sewage to the treatment plants is often on the brink of capacity, and in need of replacement due to age. The large amounts of relatively clean water that dilute the sewage create a need for larger sewer pipelines, and make it more difficult to treat the sewage. If the relatively clean water was removed from the sewage system, smaller sewer lines would suffice, and the sewage would be easier to handle.

Additionally, soaps or shampoos may be developed that are actually beneficial to plants and landscaping. Many soaps on the market today are already environmentally correct and are becoming more so every day. In this event, it would seem imperative to have a system that would enable one to conserve all water from showers and baths, as well as washing machines, for subsequent irrigation purposes.

Therefore, a need exists for a system that can greatly reduce water usage by collecting the relatively clean water that typically enters the sewer lines from the bathtub/shower drains, and using this water for irrigation and watering purposes.

III. SUMMARY OF INVENTION

One object of the present invention is to provide a system that collects clean water from a bathtub/shower drain in a water storage tank for later use.

Another object of the present invention is to provide a valve that directs clean water from a bathtub/shower drain to a water recycling tank.

A still further object of the invention is to provide a valve for directing clean water from a bathtub/shower drain to a water recycling tank that is easily adaptable with a retrofit kit to the plumbing of an existing bathtub or shower.

A further object of the invention is to provide a valve for directing clean water from a bathtub/shower drain to a water recycling tank that can be installed on new plumbing.

Another object of the invention is to provide a valve for directing clean water from a bathtub/shower drain to a water recycling tank that allows safe drainage in case of bathtub water overflow.

A further object of the invention is to provide a valve for directing clean water from a bathtub/shower drain to a water recycling tank that includes a sewer outlet to the sewer line, wherein the sewer outlet also serves as a bypass for the outlet to the recycled water tank.

Yet another object of the invention is to provide a water recycling system wherein clean water from a bathtub or shower drain is directed to a recyclable water tank that stores the water for irrigation purposes.

Still another object of the invention is to provide a water recycling system wherein clean water from a bathtub or shower drain is directed to a faucet to which a hose can be connected for cleaning or hand-watering purposes.

These and other objects of the present invention are achieved through the use of a dual outlet tub drain valve that comprising a first inlet for accepting water from the drain of a bathtub; a second inlet for accepting water from the overflow drain of a bathtub or, for serving as a vent pipe connection; a first outlet leading to a sewage line; a second outlet leading to a recyclable water storage tank; and valve means for alternatively blocking the first outlet and the second outlet, such that water from both the first and second inlet either flows out the first outlet to a sewer line or out the second outlet to a recyclable water storage tank.

These and other objects of the present invention will now become apparent from a review of the drawings and the following description of the preferred embodiments.

IV. BRIEF DESCRIPTION OF THE DRAWINGS

FIG. 1 is a representational drawing of the water conservation system using the dual outlet bathtub/shower drain valve of the present invention.

FIG. 2 is a partial cross-sectional view of the bathtub/shower drain valve of the prior art.

V. DETAILED DESCRIPTION

Figure 3:
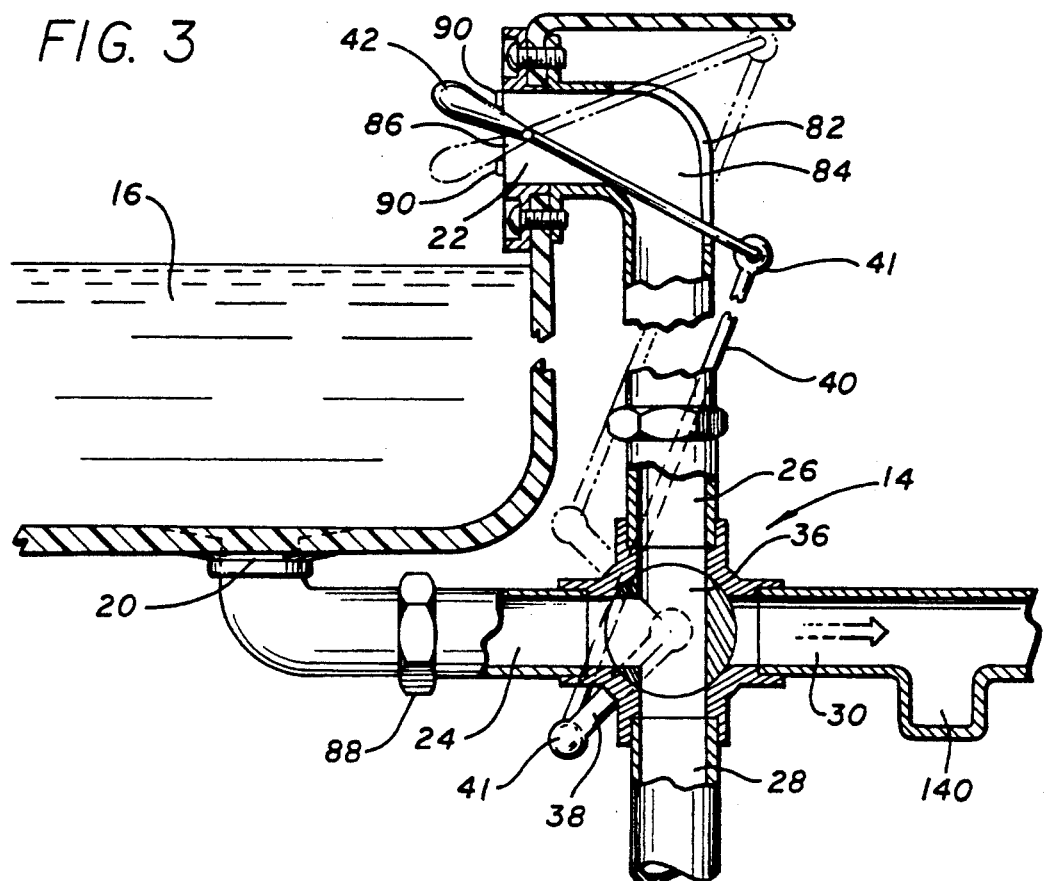
FIG. 3 is a partial cross-sectional view of the dual outlet bathtub/shower drain valve of the water conservation system shown in FIG. 1.

Referring first to FIGS. 1 and 3, the preferred use of a water conservation system 12 utilizing a dual outlet bathtub/shower drain valve 14 of the present invention is shown. The primary components of the water conservation system 12 are a standard bathtub/shower combination 16, the dual outlet valve 14, and a water storage tank 18. The standard bathtub/shower combination 16 includes a drain outlet 20 and an overflow outlet 22. The valve 14 includes a first inlet port 24, a second inlet port 26, a first outlet port 28 and a second outlet port 30. The bathtub drain outlet 20 connects to the first inlet port 24 of the valve 14, and the bathtub overflow outlet 22 connects to the second inlet port 26 of the valve 14. The first outlet port 28 of the valve 14 is connected to a sewer line 32, and the second outlet port 30 is connected to the water storage tank 18.

As depicted in FIG. 1, the water storage tank 18 is preferably located a few feet below the level of the standard bathtub 16, such that gravity causes the recycled water to naturally flow from the second outlet port 30 to the storage tank 18. In the embodiment shown, the water storage tank 18 is located a few feet below ground level in the yard just outside of the foundation of the house. However, in some home locations the water storage tank 18 may be located wherever most convenient. For example, in a home with a garage below the house, the water storage tank 18 may be located in the garage. The advantages of locating the water storage tank either underground or in a garage are that the tank is protected from freezing temperatures, and that a hidden tank is more aesthetically pleasing than a tank in full view.

The water in the storage tank 18 is directed from the tank 18 to a recycled water outlet 34. In the embodiment shown, the outlet 34 for the water storage tank 18 is a sprinkler system wherein the recycled water is pumped to water the grass or ground over in the yard. The water in the storage tank 18 may also be used in an agricultural irrigation system. Additionally the water in the storage tank 18 may be connected to a faucet, to which a hose is connected. The water may then be used for hosing driveways, hand-watering and other purposes.

The outlet 34 for the recycled water from the storage tank 18 preferably includes a spring-loaded check valve, a shut-off valve and an anti-siphon valve (not shown) in combination to prevent contamination of the main potable water supply, if the user wishes to have his city water supply tied into the same irrigation line as his recycled water supply in order to satisfy municipal plumbing codes. Depending on the size of the yard and number of people in the house, in many cases it is likely that the recycled water supply will be sufficient in meeting all landscape watering requirements, thereby eliminating the need for city water supply connections. Also, for safety purposes, any outlet for the water from the storage tank 18 should include a label reading "Non-Potable Water" or "Do Not Drink".

Referring now to FIG. 3, the preferred embodiment of the dual outlet valve 14 of the present invention is shown in detail. As previously described, the valve 14 includes two inlet ports 24 and 26, and two outlet ports 28 and 30. The drain outlet 20 from the bathtub 16 is coupled to the first inlet port 24 of the valve 14, and the overflow outlet 22 from the bathtub 16 is coupled to the second inlet port 24 of the valve 14. The first outlet port 28 of the valve 14 is connected to the sewer line 32, and the second outlet port 30 of the valve 14 is coupled to the water storage tank 18. Preferably, a simple dripleg filter 140 with removable cap is installed between the second outlet port 30 and the water storage tank 18 in order to trap dirt or any other heavy contaminants. If the valve 14 is used in a shower stall without an overflow drain, the second inlet port 26 is preferably connected to an air vent to allow the flow of water through the valve.

The valve 14 includes one and one-half inch full port inlets and outlets. The ball portion 36 of the ball valve has a three-directional passageway for water flow. As seen in FIG. 3, the valve passageway fully opens the water communication between the three connected ports at either of its first or second positions of use without restricting the gravity flow of the water therethrough. The ball valve 14 will also conform with IAPMO standards.

In the preferred embodiment shown in FIG. 3, the ball shifts from a first position to a second position during use. In the first position, the ball portion 36 blocks the second outlet port 30 of the valve 14, such that water can only flow out the first outlet port 28 to the sewer line 32. In the second position, the ball portion 36 blocks the first outlet port 28 of the valve, such that the water can only flow out the second outlet port 30 to the water storage tank 18. In FIG. 3, the ball portion 36 is shown in its first position, blocking the second outlet port 30.

As also shown in FIG. 3, the ball portion 36 of the valve 14 is interconnected through the casing of the valve to a handle 38. In the preferred embodiment, the handle 38 has a first position and a second position, corresponding to the first and second positions of the ball portion 36 of the valve 14 previously described. The handle 38 is connected to a position lever 42 via two ball joints 41 at each end that are interconnected by a linkage 40. Preferably, the linkage 40 is a one-quarter inch steel rod. The position lever 42 extends into the body of the bathtub 16 for easy access by the user. Therefore, the linkage 40 interconnects the ball portion 36 to the lever 42, such that switching the lever 42 from an up position to a down position causes the ball portion 36 of the valve to rotate approximately ninety degrees thereby changing the valve 14 from the first position to the second position. Switching the lever 42 from the down position to the up position causes the ball portion to rotate approximately ninety degrees in the opposite direction, thereby shifting the valve 14 from a second position to the first position. The handle 38, linkage 40, and lever 42 are shown in FIG. 3 in their first position, with the ball portion 36 of the valve 14 in a corresponding first position. However, for purposes of reference, the dotted lines of FIG. 3 represent the handle 38, linkage 40, and lever 42 in their second position. As shown in FIG. 3, throughout the travel of the linkage 40, the linkage 40 maintains a close proximity with the existing pipes of the bathtub plumbing. Therefore, the valve 14 is easily adaptable to pre-existing bathtubs where the existing plumbing and construction may inhibit the available area for the valve 14 linkage travel.

For purposes of reference, the standard plumbing in a pre-existing bathtub/shower is shown in FIG. 2. As shown in FIG. 2, the stop drain lever 42a exists in the prior art plumbing, as does the bathtub drain outlet 20a and overflow outlet 22a. The prior art valve 13 is connected to the drain outlet 20a, overflow outlet 22a and sewer line by a plurality of unions 88. In the prior art plumbing, the lever 42a is shifted from a first position to a second position in order to block the bathtub drain outlet 20a so that the bathtub 16 can be filled with water.

The new dual outlet valve 14 of the present invention, shown in FIG. 3, is easily installed on the pre-existing prior art plumbing as shown in FIG. 2 by a retrofit kit. The kit includes the valve 14, the handle 38, the linkage 40, the ball joints 41, lever 42, and an overflow elbow 84 with an extended slot 82 cut into the elbow 84. To install the valve 14, the pre-existing overflow plate 86a, lever 42a, elbow 84a, and linkage 40a are removed. The old valve 13 is also removed from the plumbing by loosening the three unions 88. The new valve 14 is then inserted and the second outlet pipe and a fourth union to the water storage tank is added. The new lever 42, overflow plate 86, linkage 40, ball joints 41, handle 38 and valve 14 is then installed. As shown in FIG. 3, the position lever 42 will extends through the slot 82, such that the end of the position lever with an attached ball joint 41 is external to the overflow piping. It should be noted that, although a new overflow plate 86 and handle 42 may be installed with the new valve 14, the new overflow plate 86 and lever 42 will conform with the dimensions of the pre-existing overflow plate 86a and lever 42a. The overflow plate 86 preferably includes a label 90 indicating "WASTE" in the upward position of the lever 42, and "SAVE" in the downward position of the lever 42. The water storage tank and accompanying plumbing may be installed simultaneously with the valve 14, or at a later date. If the water storage tank 18 is not installed until a later time, the lever 42 should always remain in an upward position, so that the water always drains to the sewer.

Figure 4:
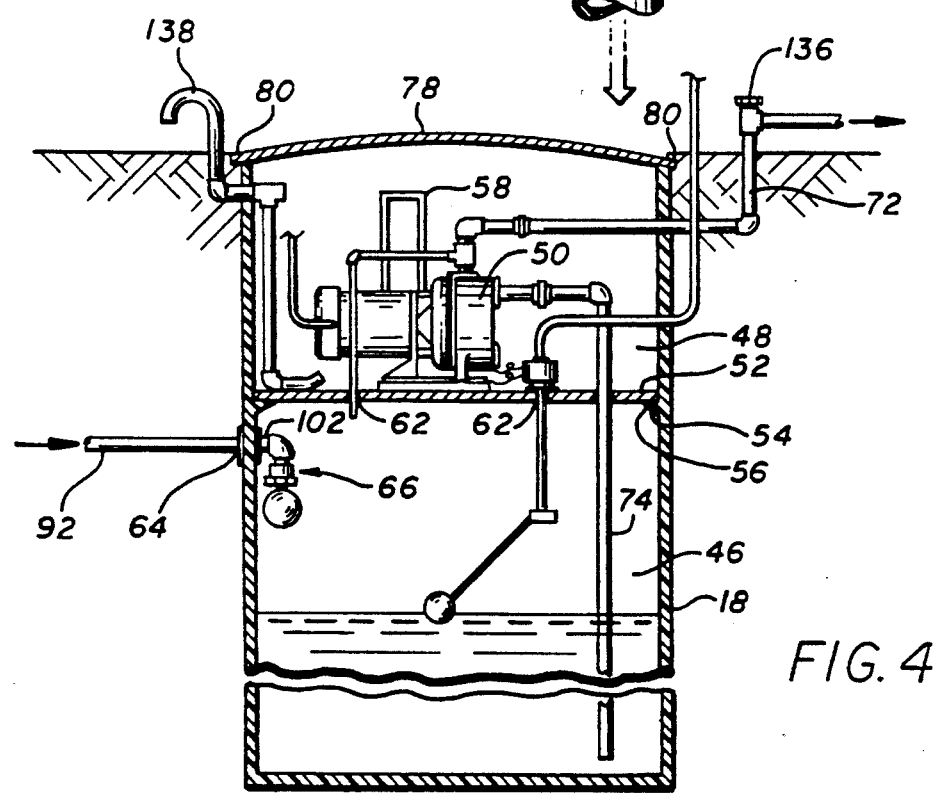
FIG. 4 is a cross-sectional view of the water storage tank of the water conservation system shown in FIG. 1.

Referring now to FIG. 4, the water storage tank 18 of the present invention is shown in detail. As previously described, the water-storage tank 18 is located a few feet below the level of the bathtub so that gravity causes the clean water to naturally flow into the tank 18. If the tank 18 is located under ground, the tank is preferably surrounded by a one inch thickness of the pea gravel on the sides of the tank 18 and six inches on the bottom. The pea gravel may prevent damage to the tank 18 in the event of movement of the ground surrounding the tank 18 or uneven backfill by the installer.

In the embodiment shown, the water storage tank primarily comprises a first water storage compartment 46, a pump storage compartment 48, and a pump 50. The water storage compartment 46 is separated from the pump storage compartment 48 by a water storage compartment lid 52. The lid 52 is supported by a plurality of lid supports 54 formed on the interior rim of the water storage compartment 46. In the preferred embodiment shown, the lid supports 54 are comprised of a lip 56 formed on the interior perimeter of the water storage compartment 46. However, other types of lid supports could be utilized. The lid 52 further includes a means 58 for lifting the lid 52 off the water storage compartment 46. In the embodiment shown, the lid lifting means 58 is located on the pump. The lid 52 and pump may therefore be removed for periodic cleaning or inspection purposes of the water storage compartment 46. The lid 52 also includes a plurality of plumbing line apertures 62. The apertures 62 allow the plumbing lines to communicate between the pump storage area 48 and the water storage compartment area 46.

Still referring to FIG. 4, the water storage compartment 46 includes a water storage tank inlet port 64, through which the water enters from the second outlet port 30 of the valve 14. The tank inlet piping 92 is connected to the inlet port 64 through an opening in the tank wall where a one and one-half inch PVC male adapter 102 is secured and gasketed on the inside of the tank. The portion of the inlet piping 92 running under the foundation of the house connecting to the tank is preferably flexible spa piping.

Figure 5:
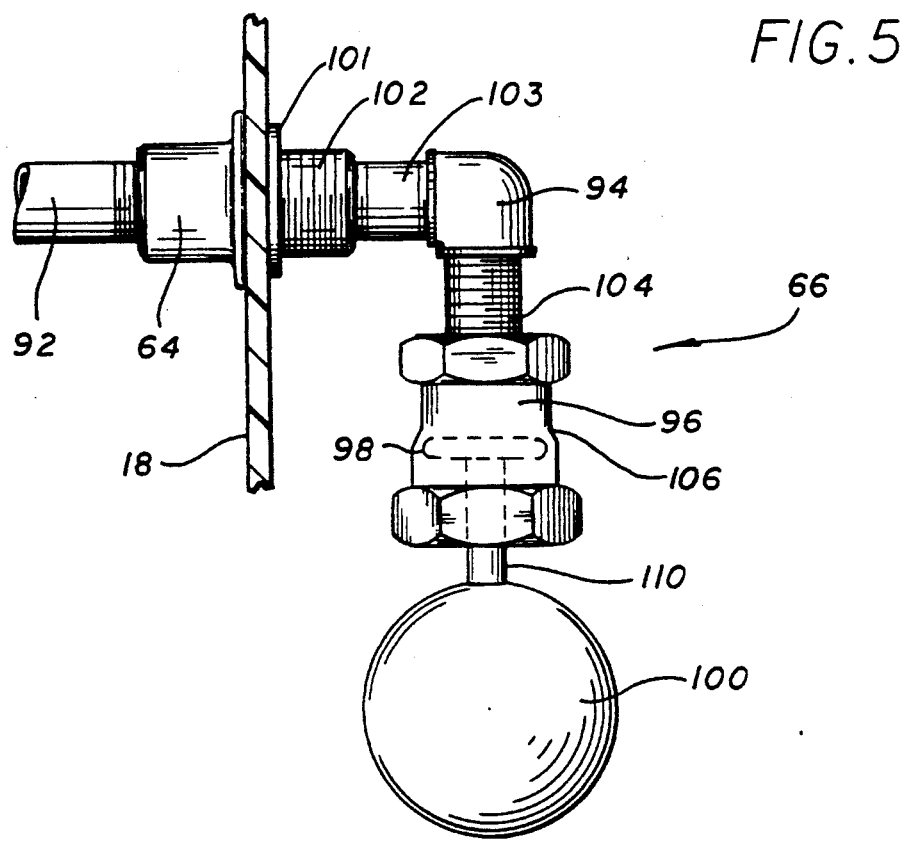
FIG. 5 is a front view of the anti-overfill valve of the water recycling tank of the water conservation system shown in FIG. 1.

The inlet port 64 also preferably includes an anti-overfill valve 66. The anti-overfill valve 66, best shown in FIG. 5, is primarily comprised of a fitting 96, with a seat portion 106, a disk 98, a floatable bulb 100, and a rigid stem 110. The disk 98, preferably a teflon disk, is disposed within the fitting 96 and has a diameter larger than the diameter of the seat 106 of the fitting 96. The floatable bulb 100 is connected by the rigid stem 110 to the center of the disk 98, such that a rise in water level in the water storage compartment 46 causes the bulb 100 to rise, causing the disk 98 to be forced against the seat 106 of the fitting 96 preventing further entry of water into the water storage compartment 46.

The valve 66 is mounted onto an elbow section of pipe 94. The elbow section 94 of pipe is preferably a one and one-half inch ninety degree PVC street elbow. The elbow 94 has a first end 103 and a second end 104. The first end 103 has female threads, and screws into a PVC male adapter 102. The elbow, when fully screwed into the adapter 102, compresses a gasket 101 to provide a watertight connection. The second end 104 of the elbow 94 is secured to the fitting 96.

Figure 6:
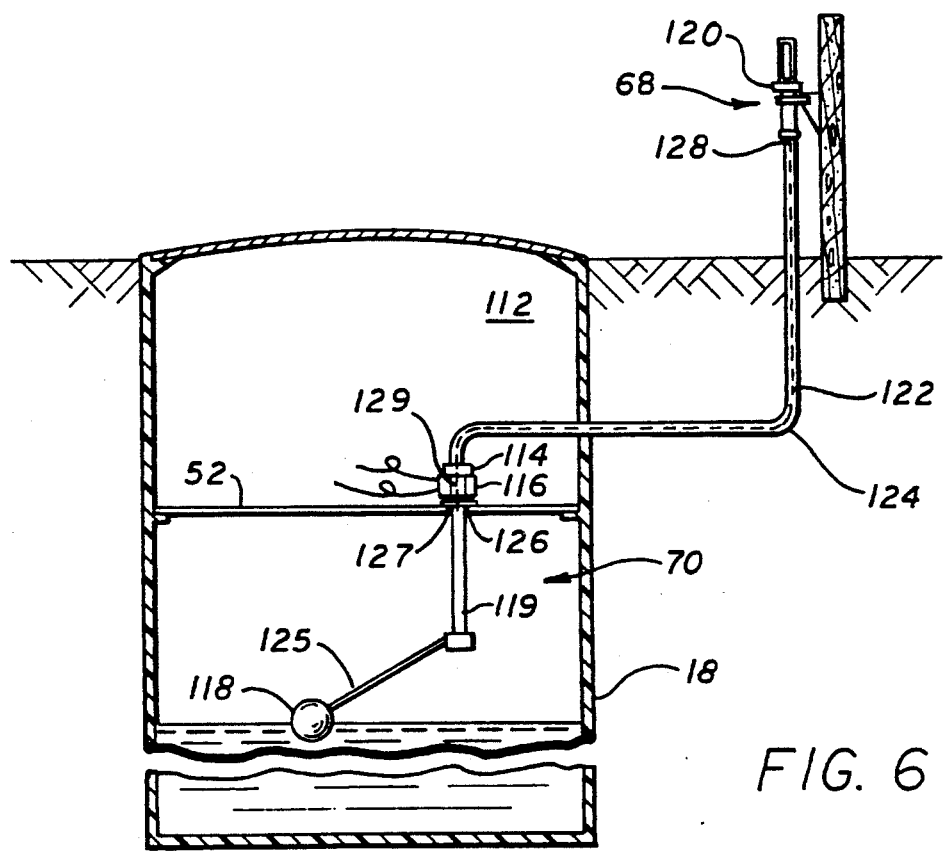
FIG. 6 is a schematic view of the combination water level gauge and low water pump cut-of switch of the water recycling tank of the water conservation system shown in FIG. 1.

The water storage tank 18 also includes means 68 for remote grounds indicating the level of water in the water storage compartment 46, and means 70 for de-energizing the pump when the water level in the water storage compartment 46 reaches a pre-determined low level. In the preferred embodiment, the level indicating means 68 and pump de-energizing means 70 are a combined water level monitoring device 112 shown best in FIG. 6. Referring now to FIG. 6, the water level monitoring device 112 is primarily comprised of a mercury switch 114, a pivotable mount for the mercury switch 116, a float 118, a float linkage arm 119, a spring-loaded level gauge 120, and a beaded chain 122. The mercury switch 114 and mercury switch mount 116 are located in the pump storage compartment 48. The mercury switch 114 is coupled in series between the power supply and the pump motor. The float 118 and the float linkage arm 119 are located within the water storage compartment area 46. The spring-loaded fluid level gauge 120 is located above ground level, near the storage tank 18, so that the amount of water in the tank is easily readable.

The float linkage arm has a first end 125 and a second end 126. The float 118 is connected to the first end 125 of the linkage arm 119. The second end 126 of the float linkage arm 119 extends through an aperture in the lid 52, and into the pump storage compartment. A first end 127 of the beaded chain 122 is connected to the second end 126 of the float linkage arm 119. A second end 128 of the beaded chain 122 is coupled to the spring loaded gauge 120.

The beaded chain 122 is preferably stainless steel, and substantially encased in a hollow pipe 124, preferably one-quarter inch soft copper tubing, to allow free movement of the chain between the gauge 120 and the float linkage arm 119. A portion of the beaded chain 118 in close proximity to the first end of the chain is partially encased in a slotted nipple 129. Preferably the slotted nipple 129 is a ⅛" steel nipple. The slotted steel nipple 129 serves to harness a portion of the chain to the pivotable mercury switch mount 116.

Therefore, when the level of water in the water storage compartment is low, the floatable element 118 pulls the beaded chain 122 downward, tilting the mercury switch 116 downward so that the mercury switch 114 de-energizes the pump 50. When the water level causes the floatable element 118 to rise, the spring-loaded gauge 120 retracts the beaded chain 122 to a degree necessary to cause the mercury switch mount 116 to tilt upward to a level to allow the pump 50 to be energized. Simultaneously, the beaded chain 122 causes the gauge 120 to reflect a calibrated water level in the tank 18.

It should be noted that the pump storage area 48 provides underground air space for mounting the pump and other plumbing required for the water storage tank 18. However, if the water storage tank 18 is not located underground, but rather in a garage or elsewhere above-ground as previously described, the water storage tank 18 does not require the separate pump storage area 48. Instead, the pump 50 may be mounted exterior to the tank and the remote water level gauge would not be required.

For purposes of completeness, the desired specifications of the water storage tank 18 are given. The depth of the entire water storage tank below ground level is preferably seventy-two inches. The pump storage compartment 48 extends thirty inches below ground, while the water storage compartment 46 extends the remaining forty-two inches below the pump storage compartment 48. The tank 18 is preferably thirty-six inches in diameter. The tank 18 is also preferably constructed of a fiberglass material.

The pump 50 is located within the pump storage compartment 48. In the preferred embodiment, the pump 50 is a GOULDS AQUA-LAWN (TM) sprinkling pump, series XSH and XSL, however specific other types of positive suction pumps may be used. The pump 50 includes a first pump discharge 72 that directs the recycled water to the recycled water outlet 34, which is preferably a sprinkler system or an outdoor faucet. Precautions regarding cross-contamination of the main water supply have already been addressed. The pump outlet also preferably includes a pump primer inlet 136 readily accessible above ground and incorporated in the pump discharge piping wherein water may be allowed into the pump 50 in order to prime the pump on start-up or after long periods of non-use.

A pump inlet 74 suctions water from the water storage compartment 46 into the pump 50. The pump also includes an air and moisture vent 138 to allow air and moisture to vent into and out of the pump compartment area 48. The pump 50 may be energized by an above ground on/off switch or preferably by a manual timer. The pump further includes a safety bypass line 62. The safety by-pass line 62 is preferably a one-quarter inch PVC line returning from the discharge side of the pump into the water storage compartment 46. The safety by-pass line prevents over-heating of the pump if dead-heading occurs.

The upper end of the pump storage compartment 48 is substantially flush with ground level. For protection, the pump storage compartment 48 is covered with a top cover 78. The top cover 78 preferably includes an extended lip 80 around the perimeter of the cover 78. The extended lip 80 should extend one to two inches beyond the upper perimeter of the pump storage compartment 48. The top cover 78 also preferably has a convex upper surface for strength. The shape of the cover 78 and extended lip 80 will enable the top cover to support foot traffic.

The operation of the preferred embodiment of the dual outlet bathtub drain valve will now be described in detail. In order to take a shower, the user turns on the hot water in the bathtub/shower. Typically, however, it takes several minutes for the hot water to travel from the water heater to the bathtub. Therefore, the user switches the lever 42 to the second position, wherein the water runs by gravity through the bathtub drain outlet 20, into the first inlet port 24 of the valve 14, out the second outlet port 30, and into the water storage tank 18. After the water has reached the desired temperature, the user switches the lever 42 to the first position and takes a shower. The used water flows out the bathtub drain outlet 20, into the first inlet port 24 of the valve 14, out the first outlet port 28 of the valve 14, and into the sewer line 32. After showering, the user may decide to stand under a hot shower, during which time the water flowing into the drain is relatively clean and soap-free. Therefore, the user could, at that time, switch the lever 42 back to the second position in order to save that water in the water storage tank 18. As described before, soap may soon be on the market such that the water used during the bathing process may be saved as well.

It is noted that even if soaps are developed that allow the recycling of all water, the valve 14 is still beneficial in that if the tank becomes full or if a component in the system has failed, the user must have a way of by-passing the storage tank. For example, if the water storage tank 18 has become full and the anti-overfill valve 66 has closed, a condition would exist in which the user would have to bypass the storage tank. Since the tank 18 would not be accepting additional water, the additional water could conceivably back up through the overflow plate 86 or through the slot 82. In that situation, the operator would recognize that the tank was full, and would change the position of valve 14 to redirect the water to the sewer. The valve 14 will therefore provide a sewage line option as a bypass to the water storage tank.

As previously described, the preferred embodiment of the valve 14 is designed for easy adaptation to a pre-existing bathtub. It should be noted, however, that the same valve and retrofit kit may be installed on a new bathtub with a new lever, wherein the lever and linkage assembly has three positions that correspond to three positions of the ball valve. In this embodiment, the previously described first and second positions of the valve are the same. However, the valve is also capable of a third position wherein the ball portion 36 of the valve rotates so as to only block the first inlet port of the valve. The third position is useful when the user desires to take a bath. In this third position, a manual bathtub drain plug is not required. Instead, the valve serves to block the outlets of the valve so that the tub fills with water. Therefore, when the user initially turns on the water, the valve is turned to the third position, so that the bathtub fills with water. After bathing, the user then turns the valve to the either the first position or the second position, depending on whether he desires to save the water from the bathtub in the water storage tank.

As another alternative, the means for alternatively blocking the first outlet, second outlet, and first inlet could include electronic actuator switches, or other type of three-position levers.

Having thus described exemplary embodiments of the present invention, it should be noted by those skilled in the art that the within disclosures are exemplary only and that various other alternatives, adaptations and modifications may be made within the scope of the invention. Thus by way of example, but not of limitation, the dual outlet valve of the present invention may be adapted for use in other water-using devices, such as automatic dishwashers or washing machines. The usage of the valve depends on the desired purity of the water sent to the water storage tank. Alternatively, the lever 38 may be easily adapted to be located in different locations, such as at eye-level in a shower stall wall for ease of operation or to be substituted with electronic switches or other switching devices. Additionally, automatic sensors that detect the purity of the water may be positioned just after the bathtub drain, but before the valve, in order to automatically turn the valve one way when the water is clean and the other way when dirty. Accordingly, it is to be understood that the present invention is not limited to the precise construction as shown in the drawings and described hereinabove.

I claim:

1. A manually operated water drain control valve for use with a bathtub/shower having a used potable water drain line, an overflow line, a sewer line and a water storage tank line, said valve alternatively directing water from said drain line and/or said overflow line flowing by gravity to either said sewer line or said water storage tank line, the valve comprising:

a first inlet adapted to be connected to said drain line for accepting water from said used potable water drain line;

a second inlet adapted to be connected to said overflow line for accepting water from said overflow line;

a first outlet adapted to be connected to said sewer line;

a second outlet adapted to be connected to said water storage tank line;

each of said first inlet, first outlet and second outlet having full port inlets and outlets, respectively, which are of the same internal diameter as the line to which the same can be connected;

ball portion means for alternatively blocking the first outlet and the second outlet, such that water from the first inlet and the second inlet flows out the second outlet when the first outlet is blocked, and the water from the first inlet and the second inlet flows out the first outlet when the second outlet is blocked, said ball portion means including a three-directional passage which is fully open to three of said inlets and outlets when either of said first outlet or second outlet is blocked;

wherein there is an intersection of the first inlet, the second inlet, the first outlet and the second outlet, and the ball portion means comprises:

a ball-shaped element having said three-directional passage therethrough, said ball-shaped element being disposed within the intersection of the first inlet, the second inlet, the first outlet and the second outlet;

a handle connected to the ball-shaped element for rotating the ball-shaped element within the valve;

a lever adapted to be located in the bathtub/shower accessible to a user thereof, the lever having a first position and a second position; and linkage connecting the lever and the handle, such that switching the lever from a first position to a second position causes the ball-shaped element to shift from a first position to a second position whereby said user can select the direction of water flow while water is flowing to said water drain line.

2. A valve in accordance with claim 1 wherein the valve has a valve casing, the handle is accessible from the exterior of the valve casing and is interconnected with the ball-shaped element through the valve casing and further wherein the linkage is adapted to be positioned exterior to the drain line and the overflow line.

3. A valve in accordance with claim 1 wherein the linkage is adapted to maintain a close radius to the drain line and the overflow line.

* * * * *